United States Patent [19]

Evers

[11] 4,255,225
[45] Mar. 10, 1981

[54] COMBINED HEAT SEALER AND CUT-OFF DEVICE

[75] Inventor: Jack R. Evers, Torrance, Calif.

[73] Assignee: Developak Corporation, Redondo Beach, Calif.

[21] Appl. No.: 76,453

[22] Filed: Sep. 17, 1979

[51] Int. Cl.³ .................. B32B 31/00; B30B 5/02
[52] U.S. Cl. ........................ 156/515; 156/530; 156/583.9
[58] Field of Search .............. 156/530, 583.8, 583.9, 156/515

[56] References Cited

U.S. PATENT DOCUMENTS 2,759,090   8/1956   Frye ........................... 156/530

Primary Examiner—Douglas J. Drummond
Attorney, Agent, or Firm—Charles E. Brown

[57] ABSTRACT

This relates to a device for pinching off a length of a continuous tube and heat sealing the same, together with a cutting off of the closed end tube portion. A pivot is provided on which there is mounted a pair of blade like members each carrying a heat sealing member with the heat sealing members being cooperable both to flatten or pinch the tube and to heat seal together the pinched together portion of the tube. A blade element is also carried by the pivot and is cooperable with the heat sealing members to cut off the pinched and heat sealed tube portion. Plungers are provided for effecting the pivoting of the blade like members and the blade elements and the plungers are carried by guide sleeves which extend through a machine wall with there being on the opposite side of the machine wall suitable drive means for effecting the controlled reciprocation of the plungers.

10 Claims, 4 Drawing Figures

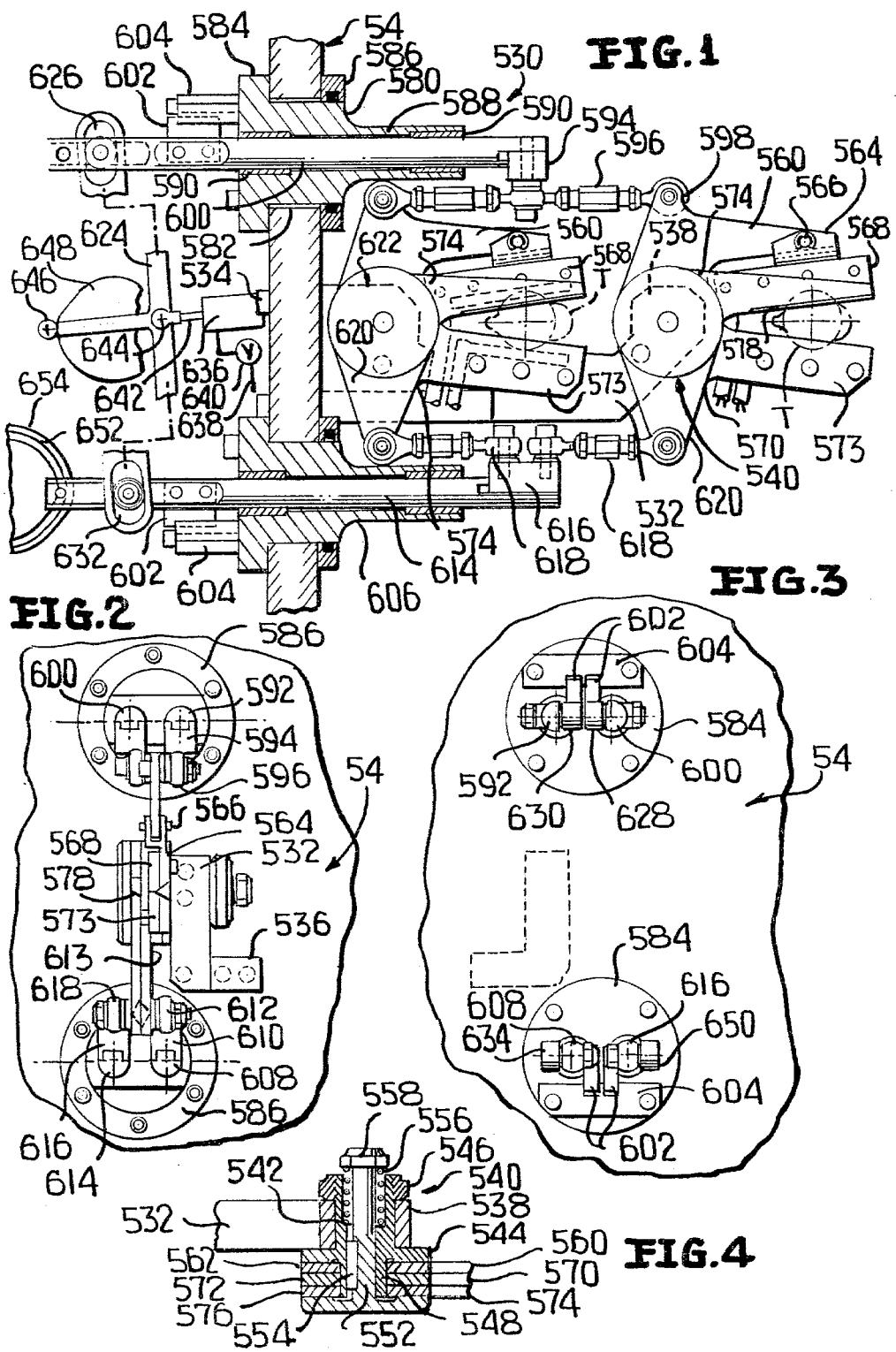

COMBINED HEAT SEALER AND CUT-OFF DEVICE

This invention relates in general to new and useful improvements in the forming of bags from a continuous web which is first shaped into a tubular form, then provided with a longitudinal seam, after which portions of the tube are systematically pinched off and heat sealed, followed by the severing of the closed end tube portion from the remainder of the tube.

In accordance with this invention there is provided a simple heat sealer and cut-off device which includes a pivot having mounted thereon for pivotal movement a pair of blade like members, each of which carries a heat sealing member which is operable to effect the pinching of a tube and heat sealing together the pinched tube portion. There is also carried by the same pivot a blade element which is cooperable with the heat sealing members to sever the pinched off tube portion from the remainder of the tube.

One feature of the invention is the simple mounting of the blade like members and the blade element on the pivot wherein each of the blade like members and the blade element have a flat hub portion which is mounted on a pivot shaft portion and is retained in place by a spring loaded retainer which is urged axially of the pivot shaft portion.

Another feature of the invention is the provision of plungers for actuating the blade like members and the blade element, the plungers being carried by sleeve like guide members.

Another feature of the invention is the provision of a drive means which will reciprocate the plungers in timed relation. The drive means for the blade like members including a fluid cylinder which urges the heat sealing members to a cooperating closed position under a controlled force. The heat sealing members are urged towards a separated condition by an associated cam reacting on the same plungers in opposition to the fluid cylinder and the forces involved being such that the cam may override the fluid cylinder.

Finally, the construction of the heat sealer and cut-off device is such wherein when mounted in an overall machine it is carried by an upstanding machine wall which divides the machine into a sanitary machine portion and a machinery portion and wherein the means for effecting tube pinch off and heat sealing is disposed in the sanitary portion and the drive means is in the machinery portion.

With the above, and other objects in view that will hereinafter appear, the nature of the invention will be more clearly understood by reference to the following detailed description, the appended claims and the several views illustrated in the accompanying drawings.

FIG. 1 is an elevational view of the heat sealer and cut-off device with parts broken away and shown in section.

FIG. 2 is an end elevational view taken from the right end of FIG. 1.

FIG. 3 is an end elevational view taken from the left end of FIG. 1.

FIG. 4 is an enlarged fragmentary sectional view taken through one of the pivots.

Referring now to the drawings in detail, it will be seen that the machinery wall 54 is vertically disposed and has mounted thereon the heat sealer and cut-off device which is generally identified by the numeral 530.

The device 530 includes a bracket 532 which extends laterally outwardly from one side of the wall 54 and is rigidly secured to the wall by means of suitable bolts 534. The bracket 532 is braced by a plate element 536 (FIG. 2).

At the outer end of the bracket 532 there is an upstanding portion 538 which carries a pivot, generally identified by the numeral 540.

The pivot 540 includes a tubular shaft 542 which has an intermediate circular flange 544 which abuts against one face of the ear 538. The end of the shaft 542 remote from the flange 544 is externally threaded and carries a nut 546 which serves to fixedly position the shaft 542 relative to the ear 538.

The shaft 542 extends beyond the flange 544 and defines a pivot shaft portion 548. A circular retainer 550 is disposed at the end of the pivot shaft portion 548 remote from the flange 544 and has a shaft 552 which extends through the tubular shaft 542. The shaft 552 is keyed to the shaft 542 at 554 so that the retainer 550 is fixed against rotation relative to the flange 544. The shaft 552 is slidable within the shaft 542 and it is constantly urged through the shaft 542 by a spring 556 which reacts on a shoulder of the shaft 542 and a nut 558 carried by the shaft 552.

The means for pinching off a tube, such as the tube T includes a blade like member 560 which has a circular hub portion 562 rotatably mounted on the pivot shaft portion 548. The member 560 is provided with a holder 564 which is pivotably mounted thereon by means of a pivot pin 566. The holder 564 carries a conventional heat sealing member 568 which is disposed above the path of the tube T.

There is a second blade like member 570 whhich has a flat circular hub portion 562 pivotally mounted on the pivot shaft portion 548 adjacent the hub 562. The blade like member 570 carries a conventional heat sealing member 573 which is disposed below the path of the tube T and is in cooperating alignment with the heat sealing member 568.

There is also a blade element 574 which has a flat circular hub 576 journalled on the pivot shaft portion 548 adjacent the hub 572. The blade element 574 is disposed above the path of the tube T and is provided with a sharpened edge 578.

With particular reference to FIG. 4, it will be seen that the spring loading of the retainer 550 permits the retainer 550 to generally clamp together the hubs 562, 572 and 576 so as to maintain the hubs in position while at the same time permitting freedom of relative rotation of the hubs.

The device 530 includes actuating means for the blade like members 560 and 570 and the blade element 574. The actuating means includes an upper guide member 580 which extends through an opening 582 in the wall 54 and is fixed relative to the wall by a mounting flange 584. The opening 582 is sealed by a cover plate 586 which is telescoped over a right hand portion of the guide member 580.

The guide member 580 has a pair of bores 588 therethrough which are provided at opposite ends with bearing sleeves 590. A first plunger 592 (FIG. 2) extends through one of the bores 588 and has mounted on the right end thereof an adaptor block 594. A turn buckle like link 596 extends from the adaptor block 594 to an upstanding ear 598 on the blade like member 560 whereby reciprocation of the plunger 592 will effect pivoting of the blade like member 560.

The guide member 580 has mounted in the other bore 588 thereof a second plunger 600 which will be described in detail hereinafter.

Each of the plungers 592 and 600 is in the form of a circular cross sectional rod or shaft and in order to prevent rotation thereof while permitting axial movement thereof, as is best shown in FIGS. 1 and 3, each of the plungers carries an upstanding guide bar 602 which is engaged in a guide slot formed in a guide plate 604 secured to the mounting flange 584.

The actuating means includes a second guide member 606 which is identical to the guide member 580, but is inverted. A plunger 608 extends through one of the bores of the guide member 606 and has at the right end thereof an adaptor block 610 to which there is secured turn buckle like linkage 612 which, in turn, is connected at its opposite end to a depending ear 613 of the blade like member 570. Thus the plunger 608 controls the position of the blade like member 570.

A second plunger 614 extends through the other bore of the guide member 606 and carries at the right end thereof an adaptor block 616. Yet another turn buckle type link 618 connects the adaptor block 616 to an actuating ear 620 of a blade element 574 for actuating the blade element.

In the illustrated embodiment of the invention, there are two tube forming lines and, accordingly, the bracket 532 carries a second pivot 540. The second pivot 540 carries a second blade like member 560 which, in turn, carries a second heat sealing member 568. The second pivot 540 also carries a second blade like member 570 which carries a second heat sealing member 573. Finally, the second pivot 540 carries a second blade element 574.

In order to actuate the second blade like member 574, the plunger 600 has at the right end thereof a second of the adaptor blocks 594. A further turn buckle type linkage 622 couples the second adaptor block 594 to the ear 598 of the second blade like member 574 to position the same.

The adaptor block 614 has coupled thereto another turn buckle linkage 612 (not shown) which is connected to the ear 613 of the blade like member 570 for actuating the blade like member. In addition, there is a second turn buckle linkage 618 extending between the adaptor block 616 and the ear 620 of the second blade element 574 for actuating the same.

The plungers 592, 600, 608 and 614 are actuated in sequence by a drive mechanism disposed to the left side of the plate 54. The drive mechanism is only schematically illustrated. In simplest terms, the drive mechanism includes an arm member 624 which is provided at one end with a guide slot 626 having received therein opposed cam followers 628 and 630 carried by the plungers 600 and 592, respectively. The opposite end of the arm 624 is provided with a guide slot 632 in which there is positioned a cam follower 634 carried by the plunger 608.

The arm 624 is constantly urged to the left by an extensible fluid cylinder 636 which has coupled thereto a fluid line 638 with a pressure control valve 640 mounted therein so that fluid at a controllable pressure may be directed to the fluid motor 636 for actuating the same.

The fluid motor 636 has a piston rod 642 which is connected to the arm 624 by means of a fitting 644. It will be seen that the fluid motor 636 is operable to move the arm 624 to the right, thereby moving the plungers 592 and 608 to the right so as to cause the heat sealing members 568 and 573 to move together to a closed cooperating position. The fluid motor 636 thus controls the force of pressure of the engagement of the heat sealing members with a tube during the pinching and heat sealing operation.

The arm 624 is also provided with a cam follower 646 which engages a cam 648. The cam 648 resists the movement of the arm 624 by the fluid cylinder 636 and controls the opening and closing of the heat sealing members.

The plunger 614 is actuated separately of the plungers 592, 600 and 608. Accordingly, a cam follower 650 carried by the left end of the plunger 614 is engaged in a cam track 652 of a further cam 654. The cam 654 serves to effect reciprocation of the plunger 614 so as to actuate the blade element 574 to sever a closed end tube portion from the tube T after the closed end has been formed and heat sealed.

It is to be understood that the tubes T will be progressively fed in a step-by-step manner as the tubes are formed and that the cams 648 and 654 will be actuated in timed relation to the feeding of the tubes so that when the tubes are stationary they will be closed, heat sealed and severed.

Although only a preferred embodiment of the heat sealer and cut-off device has been specifically illustrated and described herein, it is to be understood that minor variations may be made therein without departing from the spirit and scope of the invention as defined by the appended claims.

I claim:

1. A combined heat sealer and cut-off device for cutting a continuous tube into sections of preselected length and closing one end of each tube section, said device comprising a support bracket, a pivot carried by said support bracket, a pair of cooperating scissor blade like members pivotally mounted on said pivot and carrying cooperating heat sealing members, a blade element pivotally mounted on said pivot and cooperating with said heat sealing members to sever the tube immediately adjacent a heat sealed pinched off portion of the tube to define a tube portion with a closed end and an open end, and actuating means connected to blade like members an said blade element for pivoting the same in timed relation.

2. A device according to claim 1 wherein said pivot includes a tubular shaft fixed to said bracket and presenting a pivot shaft portion at one end of said shaft, and a retainer at said one end of said shaft for retaining said blade like members and said blade element on said pivot shaft portion.

3. A device according to claim 2 wherein said retainer has a shaft portion slidably extending through said tubular shaft, and resilient means reacting on said retainer shaft portion permitting limited movement of said retainer away from said shaft one end.

4. A device according to claim 3 wherein said retainer shaft portion is locked to said tubular shaft against relative rotation.

5. A device according to claim 2 wherein each of said blade like members and said blade element have flat generally circular hubs which are journalled on said pivot shaft portion.

6. A device according to claim 1 wherein said bracket is carried by a machine wall, said actuating means includes guide sleeves carried by said machine wall, plungers mounted in said guide sleeve for reciprocating axial movement, said plungers including a separate plunger for each of said blade like members and said blade element, linkage connecting said plungers to respective ones of said blade like members and said blade element, and drive means coupled to said plungers.

7. A device according to claim 6 wherein said machine wall defines a sanitary machine portion and a machinery portion, said plungers extend through said wall, said blade like members and said blade element are dispersed in said sanitary machine portion and said drive means are disposed in said machinery portion.

8. A device according to claim 6 wherein there is a second pivot and other blade like members and another blade element mounted on said second pivot for cutting off and closing a second tube, linkage connecting one of said other blade like members and said another blade element to corresponding ones of said plungers, there is a fourth plunger, and linkage connecting the other of said other blade like members to said fourth plunger, said drive means being coupled to said fourth plunger.

9. A device according to claim 6 wherein said drive means for said plungers coupled to said blade like members include a fluid pressure actuator urging said heat sealing members to a closed position under a controlled force, and a machine element opposing said fluid pressure actuator and controlling the position of the said heat sealing members.

10. A device according to claim 9 wherein said fluid pressure actuator is an extensible fluid cylinder and said machine element is a rotatable cam.

* * * * *